(12) United States Patent
Lee et al.

(10) Patent No.: US 12,266,821 B2
(45) Date of Patent: Apr. 1, 2025

(54) COMPOSITE SEPARATOR FOR ELECTROCHEMICAL DEVICE AND ELECTROCHEMICAL DEVICE INCLUDING THE SAME

(71) Applicant: LG CHEM, LTD., Seoul (KR)

(72) Inventors: Joo-Sung Lee, Daejeon (KR); Bong-Tae Kim, Daejeon (KR); Kil-An Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 449 days.

(21) Appl. No.: 17/631,292

(22) PCT Filed: Jul. 29, 2020

(86) PCT No.: PCT/KR2020/010026
§ 371 (c)(1),
(2) Date: Jan. 28, 2022

(87) PCT Pub. No.: WO2021/020887
PCT Pub. Date: Feb. 4, 2021

(65) Prior Publication Data
US 2022/0263194 A1    Aug. 18, 2022

(30) Foreign Application Priority Data
Jul. 30, 2019 (KR) .................. 10-2019-0092560

(51) Int. Cl.
*H01M 10/44*   (2006.01)
*H01M 10/0525*  (2010.01)
*H01M 50/446*  (2021.01)

(52) U.S. Cl.
CPC ..... *H01M 50/446* (2021.01); *H01M 10/0525* (2013.01)

(58) Field of Classification Search
CPC ... H01M 50/406; H01M 50/42; H01M 50/446
See application file for complete search history.

(56) References Cited

U.S. PATENT DOCUMENTS

| | | | |
|---|---|---|---|
| 9,287,542 B2 * | 3/2016 | Takita | B29C 48/08 |
| 10,991,926 B2 * | 4/2021 | Kwon | H01M 50/443 |
| 11,769,929 B2 * | 9/2023 | Sung | H01M 50/449 |
| | | | 429/144 |
| 2006/0008700 A1 | 1/2006 | Yong et al. | |
| 2008/0248381 A1 | 10/2008 | Hennige et al. | |
| 2009/0253032 A1 | 10/2009 | Takita et al. | |
| 2009/0274955 A1 | 11/2009 | Kikuchi et al. | |
| 2010/0285348 A1 | 11/2010 | Murata et al. | |
| 2012/0077113 A1 | 3/2012 | Kim et al. | |
| 2013/0224558 A1 | 8/2013 | Kim et al. | |
| 2014/0295170 A1 | 10/2014 | Kim et al. | |
| 2014/0315065 A1 | 10/2014 | Mizuno et al. | |
| 2014/0322586 A1 * | 10/2014 | Lee | H01M 50/457 |
| | | | 429/144 |
| 2014/0370358 A1 | 12/2014 | Hong et al. | |
| 2016/0028064 A1 | 1/2016 | Choi et al. | |
| 2016/0204407 A1 * | 7/2016 | Kai | H01M 10/0525 |
| | | | 429/144 |
| 2018/0138508 A1 | 5/2018 | Komaba et al. | |
| 2019/0051906 A1 | 2/2019 | Rhee et al. | |
| 2020/0411826 A1 | 12/2020 | Lee et al. | |
| 2021/0320378 A1 * | 10/2021 | Lee | H01M 10/0525 |
| 2022/0263194 A1 | 8/2022 | Lee et al. | |
| 2022/0294079 A1 * | 9/2022 | Zhang | H01M 10/0585 |
| 2023/0344077 A1 * | 10/2023 | Qiu | H01M 4/622 |

FOREIGN PATENT DOCUMENTS

| | | | | |
|---|---|---|---|---|
| CN | 1868077 | A | 11/2006 | |
| CN | 105390643 | A | 3/2016 | |
| CN | 108963164 | A | 12/2018 | |
| CN | 109037555 | A | 12/2018 | |
| CN | 112054150 | A * | 12/2020 | ........... C09D 133/26 |
| CN | 114094280 | A * | 2/2022 | |
| EP | 2 779 277 | A1 | 9/2014 | |
| JP | 10-298324 | A | 11/1998 | |
| JP | 2012-529742 | A | 11/2012 | |
| JP | 5202949 | B2 | 6/2013 | |
| JP | 2013-144442 | A | 7/2013 | |
| JP | 2014-102882 | A | 6/2014 | |
| JP | 2015-501523 | A | 1/2015 | |
| JP | 2015-26459 | A | 2/2015 | |
| JP | 2018-29069 | A | 2/2018 | |
| KR | 10-2008-0110661 | A | 12/2008 | |
| KR | 10-2013-0066746 | A | 6/2013 | |
| KR | 10-2015-0037394 | A | 4/2015 | |
| KR | 10-2015-0050505 | A | 5/2015 | |
| KR | 10-2016-0032311 | A | 3/2016 | |
| KR | 10-2016-0054936 | A | 5/2016 | |
| KR | 10-2016-0131761 | A | 11/2016 | |
| KR | 10-2017-0109945 | A | 10/2017 | |
| KR | 10-2017-0129641 | A | 11/2017 | |
| KR | 10-2018-0037617 | A | 4/2018 | |
| KR | 10-2018-0050178 | A | 5/2018 | |
| KR | 10-1989533 | B1 | 6/2019 | |
| KR | 20190140870 | A * | 12/2019 | |
| WO | WO-2017033993 | A1 * | 3/2017 | ........ H01M 10/0525 |
| WO | WO-2020230825 | A1 * | 11/2020 | ............. H01G 11/06 |
| WO | WO 2021/020887 | A1 | 2/2021 | |

OTHER PUBLICATIONS

European Patent Office Extended Search Report dated Dec. 5, 2022 for European Patent Application No. 20845942.0.

(Continued)

*Primary Examiner* — Amanda C. Walke
(74) *Attorney, Agent, or Firm* — Birch, Stewart, Kolasch & Birch, LLP

(57) ABSTRACT

A composite separator for an electrochemical device, including: a porous polymer substrate having a plurality of pores; and a porous coating layer formed on at least one surface of the porous polymer substrate. The porous coating layer includes a plurality of particles and a binder positioned on at least a part of the surface of the particles to connect and fix the particles with one another. The particles include at least one of inorganic particles or organic particles, and the composite separator has a melt-down temperature of 170° C. or higher. An electrochemical device including the composite separator is also disclosed.

11 Claims, No Drawings

(56) References Cited

OTHER PUBLICATIONS

International Search Report for PCT/KR2020/010026 (PCT/ISA/210) mailed on Nov. 30, 2020.

* cited by examiner

COMPOSITE SEPARATOR FOR ELECTROCHEMICAL DEVICE AND ELECTROCHEMICAL DEVICE INCLUDING THE SAME

TECHNICAL FIELD

The present disclosure relates to a composite separator for an electrochemical device and an electrochemical device including the same.

The present application claims priority to Korean Patent Application No. 10-2019-0092560 filed on Jul. 30, 2019 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

A lithium secondary battery means a battery which includes a lithium ion-containing non-aqueous electrolyte injected to an electrode assembly provided with a cathode including a cathode active material capable of lithium ion intercalation/deintercalation, an anode including an anode active material capable of lithium ion intercalation/deintercalation, and a porous separator interposed between the cathode and the anode.

The cathode active materials for a lithium secondary battery include transition metal oxides, such as lithium-cobalt oxide ($LiCoO_2$), lithium-manganese oxide ($LiMn_2O_4$) or lithium-nickel oxide ($LiNiO_2$), or such composite oxides, the transition metals of which are substituted with other transition metals, or the like.

Among the cathode active materials, currently, $LiCoO_2$ is used frequently, since it has excellent overall physical properties, such as excellent cycle characteristics. However, it has low stability, is expensive due to a limitation in resources of cobalt as a raw material, and has a limitation in large-scale use as a power source for electric vehicles, or the like.

The lithium-manganese oxide, such as $LiMnO_2$ or $LiMn_2O_4$, is used frequently, since it has abundant resources of manganese as a raw material and uses eco-friendly manganese. Thus, it has been given many attentions as a cathode active material substituting for $LiCoO_2$. However, the lithium-manganese oxide has low capacity and shows a disadvantage of poor cycle characteristics.

Meanwhile, $LiNiO_2$ or a lithium oxide containing at least one of manganese, cobalt and other transition metals and essentially based on nickel is more cost-efficient as compared to the cobalt-based oxide, and shows high discharge capacity when it is charged to 4.3 V. Particularly, doped $LiNiO_2$ shows a reversible capacity of approximately 200 mAh/g, which is higher than the capacity (approximately 165 mAh/g) of $LiCoO_2$.

Therefore, a commercially available battery including a nickel-based lithium oxide as a cathode active material shows improved energy density, even though it shows a slightly low average discharge voltage and volumetric density. Thus, active studies have been conducted about high-capacity batteries using such a cathode active material.

Although such a nickel-based lithium oxide has an advantage of high capacity, it undergoes a rapid phase transition in crystal structure due to a change in volume during charge/discharge cycles, resulting in a problem of generation of cracking in the particles or voids in the grain boundary. This may cause damages upon a separator and degradation of safety. Therefore, there is a need for a separator having more reinforced safety. Particularly, the $LiNiO_2$ cathode active material has a disadvantage in that it cannot perform a reversible reaction well, in addition to the above-mentioned problem. Therefore, it is hardly used for a secondary battery, and requires supplement of a small amount of constitutional elements, such as Co or Al, undesirably.

A polyolefin-based porous polymer substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problem of electrochemical devices, there has been suggested a composite separator having a porous coating layer formed by coating a mixture of an excessive amount of inorganic particles with a binder on at least one surface of a porous polymer substrate having a plurality of pores.

The composite separator provided with such a porous coating layer has a shut-down temperature and melt-down temperature ranges similar to the shut-down and melt-down temperature ranges of the porous polymer substrate before coating with the porous coating layer. As a result, the composite separator hardly undergoes shrinking depending on temperature, and then is broken at a temperature exceeding the melt-down temperature. In this case, a large-area short-circuit occurs between a cathode and an anode, resulting in ignition and explosion of a battery occasionally.

Therefore, in the case of abnormal operation of a battery, such as generation of a short-circuit, it is required to develop a separator whose shut-down temperature functions at a lower temperature than the conventional temperature to interrupt electric current rapidly and to increase internal resistance (IR), thereby making it difficult to generate a rapid short-circuit so that a rapid increase in temperature of the battery may be inhibited. Particularly, it is required that the separator is designed in such a manner that the shut-down temperature may be controlled at a temperature lower than the self-heat emission temperature of a cathode active material (i.e. temperature where the cathode active material shows thermal runaway). In addition, it is required to develop a separator whose melt-down temperature functions at a higher temperature than the conventional temperature to delay a point of short-circuit generation, even if a large-area short-circuit is generated, and to decrease the voltage of battery safely through rapid self-cooling as compared to heat emission.

DISCLOSURE

Technical Problem

The present disclosure is designed to solve the problems of the related art, and therefore the present disclosure is directed to providing a composite separator for an electrochemical device, which includes a porous polymer substrate, and a porous coating layer formed on at least one surface of the porous polymer substrate and including a mixture of a binder with inorganic particles, and has a melt-down temperature of 170° C. or higher.

The present disclosure is also directed to providing a composite separator for an electrochemical device, wherein the difference between the melt-down temperature of the porous polymer substrate used for the composite separator for an electrochemical device and the melt-down temperature of the composite separator for an electrochemical device is 30° C. or higher.

In addition, the present disclosure is directed to providing a composite separator for an electrochemical device which shows improved packing density of the porous coating layer.

In addition, the present disclosure is directed to providing a composite separator for an electrochemical device which shows improved uniformity of the pores of the porous coating layer.

Further, the present disclosure is directed to providing an electrochemical device including the composite separator for an electrochemical device, and thus having improved safety.

Technical Solution

To solve the above-mentioned technical problems, in one aspect of the present disclosure, there is provided a composite separator for an electrochemical device according to any one of the following embodiments. According to the first embodiment of the present disclosure, there is provided a composite separator for an electrochemical device, including: a porous polymer substrate having a plurality of pores; and a porous coating layer formed on at least one surface of the porous polymer substrate, wherein the porous coating layer comprises a plurality of particles and a binder positioned on at least a part of the surface of the particles to connect and fix the particles with one another, wherein the particles include at least one of inorganic particles or organic particles, and the composite separator has a melt-down temperature of 170° C. or higher.

According to the second embodiment of the present disclosure, there is provided the composite separator for an electrochemical device as defined in the first embodiment, wherein the difference between the melt-down temperature of the porous polymer substrate of the composite separator for an electrochemical device and the melt-down temperature of the composite separator for an electrochemical device is 30° C. or higher.

According to the second embodiment of the present disclosure, there is provided the composite separator for an electrochemical device as defined in the first embodiment, wherein the difference between the melt-down temperature of the porous polymer substrate used for the composite separator for an electrochemical device and the melt-down temperature of the composite separator for an electrochemical device is 30° C. or higher.

According to the third embodiment of the present disclosure, there is provided the composite separator for an electrochemical device as defined in the first or the second embodiment, wherein the porous polymer substrate has a shut-down temperature of 140° C. or lower.

According to the fourth embodiment of the present disclosure, there is provided the composite separator for an electrochemical device as defined in any one of the first to the third embodiments, wherein the composite separator has a melt-down temperature in a range of 170-220° C.

According to the fifth embodiment of the present disclosure, there is provided the composite separator for an electrochemical device as defined in any one of the first to the fourth embodiments, wherein the difference between the melt-down temperature of the porous polymer substrate of the composite separator for an electrochemical device and the melt-down temperature of the composite separator for an electrochemical device is in a range 30-90° C.

According to the sixth embodiment of the present disclosure, there is provided the composite separator for an electrochemical device as defined in any one of the first to the fifth embodiments, wherein the particles are bound to one another by the binder, wherein the particles are packed and in contact with each other, thereby forming interstitial volumes among the particles, and the interstitial volumes among the particles become vacant spaces to form pores, and the ratio (a/b) of the average diameter (a) of the pores formed in the porous coating layer to the average diameter (b) of the pores formed in the porous polymer substrate is 2.0 or less.

According to the seventh embodiment of the present disclosure, there is provided the composite separator for an electrochemical device as defined in any one of the first to the sixth embodiments, wherein the ratio (a/b) of the average diameter (a) of the pores formed in the porous coating layer to the average diameter (b) of the pores formed in the porous polymer substrate is 0.75-1.25.

According to the eighth embodiment of the present disclosure, there is provided the composite separator for an electrochemical device as defined in any one of the first to the seventh embodiments, wherein the particles are inorganic particles and the inorganic particles have an average particle diameter of 10 nm-450 nm.

According to the ninth embodiment of the present disclosure, there is provided the composite separator for an electrochemical device as defined in any one of the first to the eighth embodiments, wherein the particles are organic particles and the organic particles have an average particle diameter of 10 nm-150 nm.

According to the tenth embodiment of the present disclosure, there is provided the composite separator for an electrochemical device as defined in any one of the first to the ninth embodiments, wherein the binder is at least one of polyvinyl alcohol, polyvinyl pyrrolidone, polyacrylic acid, or an acrylic copolymer.

In another aspect of the present disclosure, there is provided an electrochemical device according to any one of the following embodiments. According to the eleventh embodiment of the present disclosure, there is provided an electrochemical device including a cathode, an anode and a separator interposed between the cathode and the anode, wherein the separator is the composite separator for an electrochemical device as defined in any one of the first to the tenth embodiments.

According to the twelfth embodiment of the present disclosure, there is provided the electrochemical device as defined in the eleventh embodiment, wherein the electrochemical device is a lithium secondary battery.

Advantageous Effects

The composite separator according to the present disclosure has a melt-down temperature of 170° C. or higher, and according to an embodiment of the present disclosure, the difference between the melt-down temperature of the porous polymer substrate used for the composite separator for an electrochemical device and the melt-down temperature of the composite separator for an electrochemical device may be 30° C. or higher. Therefore, it is possible for the separator to retain its shape, thereby preventing a phenomenon, such as rapid explosion, and it is possible to ensure the safety of an electrochemical device preferably.

In addition, the composite separator for an electrochemical device according to the present disclosure uses inorganic particles having a significantly small particle diameter in the porous coating layer, and thus the porous coating layer shows improved packing density and pore uniformity. In this manner, a short-circuit between a cathode and an anode may be inhibited, even when the electrochemical device is overheated. As a result, it is possible to provide a composite separator for an electrochemical device having improved safety, and an electrochemical device including the composite separator.

Further, when using a nickel-based cathode active material for the cathode of the electrochemical device, the composite separator may not be damaged, even if the cathode active material undergoes a rapid phase transition in crystal structure due to a change in volume during charge/discharge cycles and the particles are cracked or voids are generated in the grain boundary. As a result, there is an advantage in that the electrochemical device including the composite separator has reinforced safety.

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a composite separator for an electrochemical device, including: a porous polymer substrate having a plurality of pores; and a porous coating layer formed on at least one surface of the porous polymer substrate and including a plurality of particles and a binder positioned on the whole or a part of the surface of the particles to connect the particles with one another and fix them, wherein the particles include inorganic particles, organic particles or both, and the composite separator has a melt-down temperature of 170° C. or higher.

In another aspect of the present disclosure, there is provided a composite separator for an electrochemical device, including: a porous polymer substrate having a plurality of pores; and a porous coating layer formed on at least one surface of the porous polymer substrate and including a plurality of particles and a binder positioned on the whole or a part of the surface of the particles to connect the particles with one another and fix them, wherein the particles include inorganic particles, organic particles or both, the composite separator has a melt-down temperature of 170° C. or higher, and the porous polymer substrate has a shut-down temperature of 140° C. or lower.

As used herein, 'melt-down' refers to a phenomenon of loss of the shape of a composite separator or a porous polymer substrate through melting, and a temperature where the phenomenon occurs is defined as 'melt-down temperature'.

As used herein, 'melt-down temperature' is defined as follows. First, a load of 0.01 N is applied to a composite separator or a porous polymer substrate prepared with a size of 4 mm×8 mm by using a thermomechanical analyzer (TMA), a degree of deformation is measured, while the temperature is increased at a rate of 5° C./min, and the temperature, where the composite separator or the porous polymer substrate is shrunk due to an increase in temperature, elongated again, and then broken, is measured. The temperature is defined as the melt-down temperature of the composite separator or the porous polymer substrate.

As used herein, 'shut-down' refers to a characteristic with which the porous polymer substrate used for the separator is molten to block the pores so that electric current flow may be delayed and cell reactions and exothermic reactions may be stopped to ensure safety, when exothermic reactions occur due to a rapid decrease in potential difference between a cathode and an anode upon a short-circuit of a charged electrochemical device and an electrolyte is decomposed to generate gases, such as methane, hydrogen, carbon dioxide, or the like, thereby causing a possibility of explosion. Therefore, the term 'shut-down temperature' as used herein is defined as the temperature where the pores of the porous polymer substrate are blocked completely. Such shut-down may be classified depending on a degree of pore-blocking of a porous polymer substrate. As the temperature is increased, i.e., the temperature approaches the melting point of the porous polymer substrate, the pores of the porous polymer substrate start to be blocked. The temperature at this moment is defined the first-stage shutdown temperature, i.e., shut-down start temperature. In addition, the temperature where the pores of the porous polymer substrate are blocked totally according to a further increase in temperature is defined as the second-stage shut-down temperature, i.e., shut-down finish temperature. Herein, the shut-down finish temperature has the same meaning as 'shut-down temperature'.

The shut-down temperature is determined by fixing a separator or a porous polymer substrate to a frame (outer size: 15 cm×15 cm, inner diameter: 10 cm×10 cm) with a polyimide tape, and exposing the separator or the porous polymer substrate to a convection oven at a warming rate of 3° C./min starting from 80° C. to measure the air permeation time. Herein, the temperature where the air permeation time (Gurley value) exceeds 10,000 sec/100 mL for the first time is defined as shut-down temperature. The air permeation time (sec) is determined by measuring a time required for 100 mL of air to pass through the separator or the porous polymer substrate under a constant pressure (0.05 MPa) with an air permeability tester (available from Asahi Seiko, Model name: EG01-55-1MR).

The composite separator for an electrochemical device according to the present disclosure has a melt-down temperature of 170° C. or higher. According to an embodiment of the present disclosure, the composite separator for an electrochemical device may have a melt-down temperature of 170-220° C., 170-200° C., 170-179° C., or 174-179° C. When the melt-down temperature of the composite separator for an electrochemical device satisfies the above-defined range, the separator does not undergo melt-down, even when the temperature of the composite separator is further increased after its shut-down, and thus retains its shape, thereby preventing ignition and rapid explosion of a battery caused by a large-area short-circuit between a cathode and an anode.

The composite separator for an electrochemical device may have a shut-down temperature of 140° C. or lower, 120-140° C., 122-136° C., or 124-133° C.

The difference between the melt-down temperature and the shut-down temperature of the composite separator for an electrochemical device may be 40-120° C., 50-110° C., or 60-100° C. When the melt-down temperature and the shut-down temperature show such a large difference, shut-down occurs in an early stage upon the generation of a short-circuit of an electrochemical device and the pores of the porous polymer substrate are blocked to interrupt electric current and to inhibit an increase in temperature. In addition, even when the temperature is further increased after shut-down, the separator does not undergo melt-down and the separator retains its shape to prevent rapid explosion, or the like.

In addition, according to an embodiment of the present disclosure, the difference between the melt-down temperature of the porous polymer substrate used for the composite separator for an electrochemical device and the melt-down temperature of the composite separator for an electrochemical device may be 30° C. or higher, 30-90° C., 30-70° C., 30-40° C., or 30-35° C. When the difference between the melt-down temperature of the porous polymer substrate used for the composite separator for an electrochemical device and the melt-down temperature of the composite separator for an electrochemical device satisfies the above-defined range, the composite separator has a sufficiently increased melt-down temperature as compared to the porous polymer substrate so that ignition and explosion of a battery caused by a large-area short-circuit between a cathode and an anode may be delayed, thereby providing improved battery safety.

The composite separator for an electrochemical device according to an embodiment of the present disclosure includes: a porous polymer substrate having a plurality of pores; and a porous coating layer formed on at least one surface of the porous polymer substrate and including a plurality of particles and a binder positioned on the whole or a part of the surface of the particles to connect the particles with one another and fix them, wherein the binder of the porous coating layer attaches the particles to one another (i.e. the binder interconnects and fixes the particles) so that they may retain their binding states. In addition, the particles and the porous polymer substrate are retained in such a manner that they may be bound to each other by the binder. The particles of the porous coating layer may form interstitial volumes, while they are substantially in contact with one another, wherein the interstitial volumes refer to spaces defined by the particles that are substantially in contact with one another in a closely packed or densely packed structure of the particles. The interstitial volumes formed among the particles may become vacant spaces to form pores, and the ratio (a/b) of the average diameter (a) of the pores formed in the porous coating layer to the average diameter (b) of the pores formed in the porous polymer substrate may be 2.0 or less. The particles may include inorganic particles, organic particles or both.

The ratio (a/b) of the average diameter (a) of the pores formed in the porous coating layer to the average diameter (b) of the pores formed in the porous polymer substrate may be 2.0 or less, 0.5-2.0, or 0.75-1.25. When the ratio (a/b) of the average diameter (a) of the pores formed in the porous coating layer to the average diameter (b) of the pores formed in the porous polymer substrate satisfies the above-defined range, the separator can have desired porosity and have a preferred difference between the melt-down temperature of the porous polymer substrate and the melt-down temperature of the porous coating layer.

Herein, the porosity of the porous polymer substrate is determined by dividing the 'actual density (X) (weight per unit area/thickness)' of the porous polymer substrate by 'theoretical density (Y)' of the porous polymer substrate, and is expressed in terms of percentage (%) by subtracting the calculated value from 1 and multiplying the resultant value by 100, as shown in the following formula.

'Porosity' of porous polymer substrate (%)= [1−$X/Y$]×100

Herein, the porosity of the porous coating layer is determined by dividing the 'actual density (W) (weight per unit area/thickness)' of the porous coating layer material by 'theoretical density (Z)' of the porous coating layer material, and is expressed in terms of percentage (%) by subtracting the calculated value from 1 and multiplying the resultant value by 100, as shown in the following formula.

'Porosity' of porous polymer substrate (%)= [1−$W/Y$]×100

Herein, the average diameter of the pores formed in the porous polymer substrate is determined by using a capillary flow porometer available from PMI Co.

Herein, the average diameter of the pores formed in the porous coating layer is determined by using a capillary flow porometer available from PMI Co., after coating a composition for forming a porous coating layer on a non-woven web support. This method is based on pressure application, and thus determination is not allowed, if a support, such as a non-woven web support, is not used. Since the method is a test for determining the minimum pore size in the thickness direction, the test result is not affected significantly by the support, even if a non-woven web having large pores is used as a support.

When inorganic particles are used as the particles according to an embodiment of the present disclosure, the inorganic particles may have an average particle diameter of 10-450 nm, 10-400 nm, 15-400 nm, or 15-380 nm. When organic particles are used as the particles, the organic particles may have an average particle diameter of 10-150 nm, 15-130 nm, 15-100 nm, 15-80 nm, or 15-70 nm. Herein, when each of the average particle diameter of the inorganic particles and that of the organic particles satisfies the above-defined range, it is possible to prevent a micro-short between a cathode and an anode and to maintain the functions as a separator, while facilitating transport of lithium ions.

In addition, it is more preferred that the particles have a uniform size.

The average particle diameter is D95(V), which means a diameter corresponding to 95% based on volume average particle diameter, i.e. median diameter corresponding to 95% of the total volume, when particle diameters are measured and volume accumulation is performed from smaller particles.

When the particles are inorganic particles according to an embodiment of the present disclosure, the inorganic particles may be inorganic particles having a dielectric constant of 5 or more, inorganic particles having lithium ion transportability, or a mixture thereof.

The inorganic particles having a dielectric constant of 5 or more may include $BaTiO_3$, $Pb(Zr_xTi_{1-x})O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/3}Nb_{2/3})O_{3-x}PbTiO_3$ (PMN-PT, wherein 0<x<1), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, γ-AlO(OH), SiC, $TiO_2$, or a mixture of two or more of them.

The inorganic particles having lithium ion transportability may include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), ($LiAlTiP)_xO_y$-based glass (1<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $Li_xSi_yS_z$-based glass (0<x<3, 0<y<2, 0<z<4), $Li_xP_yS_z$-based glass (0<x<3, 0<y<3, 0<z<7), or a mixture of two or more of them.

According to an embodiment of the present disclosure, the inorganic particles may be alumina particles, silica particles or a mixture thereof. The alumina particle is a compound of aluminum with oxygen, represented by the chemical formula of $Al_2O_3$. The silica particle is a compound of silicon with oxygen, represented by the chemical formula of $SiO_2$.

According to an embodiment of the present disclosure, the inorganic particles may be realized with various shapes, such as a sheet-like shape, in addition to a spherical shape.

When the particles are organic particles according to an embodiment of the present disclosure, the organic particles are not particularly limited, as long as they are used conventionally in the art. Non-limiting examples of the organic particles include polystyrene, polyethylene, polyimide, melamine-based resin, phenolic resin, cellulose, modified cellulose, polypropylene, polyester, polyphenylene sulfide, polyaramide, polyamideimide, or a mixture thereof.

According to an embodiment of the present disclosure, the porous coating layer may have a thickness of 0.5-3.0 μm, 1.0-2.5 μm, or 1.0-2.0 μm.

According to an embodiment of the present disclosure, it is preferred that the porous coating layer has a uniform pore size and the same pore size as the pore size of the porous polymer substrate so that the composite separator for an electrochemical device may have uniform ion conductivity throughout the whole surface thereof. Therefore, it is preferred that the particles contained in the porous coating layer have a uniform size and the particles have the above-defined range of average particle diameter. In addition, when the particles have non-uniform sizes, it is difficult for the porous coating layer to ensure thickness uniformity. Therefore, the particles preferably have a mono-modal type particle diameter distribution. Herein, 'mono-modal' refers to a standard deviation ranging from 1% to less than 40%, preferably ranging from 1% to 35%, when the particle diameter distribution is analyzed by using a particle size analyzer (dynamic light scattering (DLS), Nicomp 380). Meanwhile, 'bi-modal' or 'multi-modal' refers to a standard deviation of 40% or more, when the particle size and distribution are determined by using the particle size analyzer. When the standard deviation is 40% or more, two or more particle size peaks may appear.

Since significantly small particles are used according to an embodiment of the present disclosure, the density and mechanical properties of the porous coating layer are significantly improved, and the melt-down temperature of the composite separator for an electrochemical device can be increased, while the shut-down temperature of the porous polymer substrate can be reduced as much as possible.

In the composite separator for an electrochemical device according to an embodiment of the present disclosure, the binder used for forming the porous coating layer may be a water-dispersible emulsion type binder which is not dissolved in a medium but is dispersed therein, or a soluble binder dissolved in the medium.

In general, the water-dispersible emulsion type binder is present in a state of particles, when it is incorporated to a composition for forming a porous coating layer and applied to a porous polymer substrate. Thus, the binder can realize adhesion, while it is deformed under the condition of the drying temperature of the composition and surrounds the surfaces of the inorganic particles or organic particles. Therefore, it is required that the water-dispersible emulsion type binder particles are deformed under the condition of the drying temperature. Thus, the water-dispersible emulsion type binder particles preferably have a glass transition temperature ($T_g$) of 40° C. or lower. When the glass transition temperature of the water-dispersible emulsion type binder particles satisfies the above-defined range, the particles can function as a binder which improves binding force among the inorganic particles or organic particles. On the other hand, the soluble binder generally has heat resistant characteristics corresponding to a glass transition temperature of 100° C. or higher, and may be used to supplement the heat shrinkage or heat resistance of the separator.

In addition, according to an embodiment of the present disclosure, the inorganic particles may have an average particle diameter of 10-450 nm and the organic particles may have an average particle diameter of 10-150 nm, as described above. Meanwhile, the particles used conventionally according to the related art may have an average particle diameter of 500-800 nm. The emulsion binder may have an average particle diameter of 100-500 nm, and there is no difficulty in binding the conventionally used particles having such a large average particle diameter by using the emulsion binder.

Meanwhile, the inorganic particles or organic particles used according to an embodiment of the present disclosure may have a relatively smaller average particle diameter as compared to the conventionally used particles. It is more advantageous that a soluble binder with which microparticles are surrounded easily is used in combination with the emulsion type binder for the purpose of binding the inorganic particles or organic particles according to an embodiment of the present disclosure.

Particularly, a polymer having a glass transition temperature ($T_g$) of −200 to 200° C. may be used as a binder. This is because such a polymer can improve the mechanical properties, such as flexibility and elasticity, of the finally formed porous coating layer. Such a binder sufficiently functions as a binder which connects and stably fixes the inorganic particles with one another, and thus contributes to prevention of degradation of mechanical properties of a composite separator for an electrochemical device having a porous coating layer. More particularly, the emulsion type binder may have a glass transition temperature of −200 to 40° C., and the soluble binder may have a glass transition temperature of 50 to 200° C.

In addition, it is not essentially required for the binder to have ion conductivity. However, when using a polymer having ion conductivity, it is possible to further improve the performance of an electrochemical device. Therefore, a binder having a dielectric constant as high as possible may be used. In fact, since the dissociation degree of a salt in an electrolyte depends on the dielectric constant of the solvent for the electrolyte, a binder having a higher dielectric constant can improve the salt dissociation degree in an electrolyte. The binder may have a dielectric constant ranging from 1.0 to 100 (measured at a frequency of 1 kHz), particularly 10 or more.

In addition to the above-mentioned function, the binder may be characterized in that it is gelled upon the impregnation with a liquid electrolyte and thus shows a high degree of swelling. Thus, the binder has a solubility parameter (i.e., Hildebrand solubility parameter) of 15-45 MPa$^{1/2}$ or 15-25 MPa$^{1/2}$ and 30-45 MPa$^{1/2}$. Therefore, hydrophilic polymers having many polar groups may be used more frequently as compared to hydrophobic polymers, such as polyolefins. When the solubility parameter is less than 15 MPa$^{1/2}$ and more than 45 MPa$^{1/2}$, it is difficult for the binder to be swelled with a conventional liquid electrolyte for a battery.

Non-limiting examples of the binder include but are not limited to: polyvinyl alcohol, polyvinyl pyrrolidone, polyacrylic acid, acrylic copolymers, polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, or the like.

The acrylic copolymer may be a copolymer including two or more repeating units selected from repeating units derived from a cyano group-containing monomer, repeating units derived from a carboxyl group-containing monomer, and repeating units derived from a monomer having a C1-C14 alkyl group.

The cyano group-containing monomer may be at least one selected from the group consisting of (meth)acrylonitrile, 2-(vinyloxy)ethanenitrile and 2-(vinyloxy)propanenitrile. Preferably, the cyano group-containing monomer may be (meth)acrylonitrile, which has rigid property and can maintain the shape of the binder.

The carboxyl group-containing monomer may be at least one selected from the group consisting of (meth)acrylic acid, 2-(meth)acryloyloxyacetic acid, 3-(meth)acryloyloxy propylate, 4-(meth)acryloyloxy butylate, acrylic acid dimer, itaconic acid, maleic acid and maleic anhydride. Preferably, the carboxy group-containing monomer may be (meth)acrylic acid, which is distributed on the surface of the binder to improve the dispersibility.

The monomer having a C1-C14 alkyl group may be at least one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylbutyl (meth)acrylate, 2-ethylhexyl (meth)acrylate, n-octyl (meth)acrylate, isooctyl (meth)acrylate, isononyl (meth)acrylate, lauryl (meth)acrylate, tetradecyl (meth)acrylate, or the like. Herein, when the number of carbon atoms contained in the alkyl group is larger than 14, such an excessively long alkyl group shows higher non-polarity, resulting in degradation of the packing density of the porous coating layer. Preferably, the monomer having a C1-C14 alkyl group may be 2-ethylhexyl (meth)acrylate, which improves impregnation property with an electrolyte.

The acrylic copolymer may further include at least one repeating unit derived from a non-acrylic monomer (e.g. styrenic monomer, butadiene monomer, vinyl monomer, or the like), in addition to the repeating units derived from the above-mentioned monomers.

Particular examples of the acrylic copolymer may include ethylene-acrylic copolymer, ethylene-methacrylic acid copolymer, butadiene-acrylic acid copolymer, butadiene-methacrylic acid copolymer, or the like.

When the particles used herein have a small average particle diameter, a soluble binder polymer is used advantageously, since it can surround microparticles with ease to realize binding force. Particular examples of the soluble binder polymer include polyvinyl alcohol, polyacrylic acid or a mixture thereof. Particularly, since polyvinyl alcohol, polyvinyl pyrrolidone and polyacrylic acid have hydrophilicity, they are preferred in that they have high dispersibility without using additional surface treatment. The polyacrylic acid may be non-crosslinked polyacrylic acid or crosslinked polyacrylic acid. The crosslinked polyacrylic acid is advantageous in that it has high dispersibility without using additional surface treatment and reduces the resistance of the porous coating layer. The non-crosslinked polyacrylic acid is advantageous in dispersing inorganic particles or organic particles. When using a hydrophobic polymer as a binder, it is preferred that inorganic particles and organic particles are used after they are modified into hydrophobic surfaces.

The weight ratio of the particles to the binder may be 80:20-99:1, 85:15-98:2, or 90:10-97:3. When the weight ratio of the particles to the binder satisfies the above-defined range, it is possible to prevent the problem of a decrease in pore size and porosity of the resultant coating layer, caused by an increase in content of the binder. It is also possible to solve the problem of degradation of peeling resistance of the resultant coating layer, caused by a decrease in content of the binder.

The composite separator for an electrochemical device according to an embodiment of the present disclosure may further include other additives as ingredients for the porous coating layer, besides the particles (at least one of inorganic particles and organic particles) and the binder.

Particularly, the porous polymer substrate may be a porous polymer film substrate or porous polymer nonwoven web substrate.

The porous polymer film substrate or porous polymer non-woven web substrate may be a porous polymer film substrate or porous polymer non-woven web substrate including polyolefin, such as polyethylene or polypropylene. For example, such a polyolefin-based porous polymer film substrate or porous polymer nonwoven-web substrate may realize a shut-down function at a temperature of 80-140° C.

Herein, the polyolefin-based porous polymer film substrate or porous polymer non-woven web substrate may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate or porous polymer non-woven web substrate may be obtained by using various polymers, such as polyesters, besides polyolefins. Further, the porous polymer film substrate or porous polymer non-woven web substrate may have a stacked structure of two or more film layers, wherein each layer may be formed of polymers including the above-mentioned polymers, such as polyolefins or polyesters, alone or in combination of two or more of them.

In addition, the porous polymer film substrate and porous polymer nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Although there is no particular limitation in the thickness of the porous polymer substrate, the porous polymer substrate may have a thickness of 1-30 μm, 2-20 μm, 3-15 μm, or 4-12 μm. When the thickness of the porous polymer substrate satisfies the above-defined range, the porous polymer substrate can be provided with suitable mechanical strength required for a separator, while not functioning as resistance.

The pores present in the porous polymer substrate may have a size of 10-100 nm, 15-80 nm, or 20-70 nm. When the pore size of the porous polymer substrate satisfies the above-defined range, the porous polymer substrate can provide suitable functions required for a separator, while not functioning as resistance.

In addition, the porous polymer substrate may have a porosity of 30-80%, 35-70%, 38-65%, or 43-55%. When the porosity of the porous polymer substrate satisfies the above-defined range, the porous polymer substrate can be provided with suitable mechanical strength required for a separator, while not functioning as resistance.

The composite separator for an electrochemical device according to an embodiment of the present disclosure may be obtained by preparing a composition for forming a porous coating layer including particles and a binder, and applying the composition to at least one surface of a porous polymer substrate, followed by drying.

First, the composition for forming a porous coating layer may be prepared by dissolving/dispersing a binder in a solvent, adding particles (at least one of inorganic particles and organic particles) thereto and dispersing them. The particles may be added after they are pulverized in advance to a predetermined average particle diameter. Otherwise, the particles may be added to a solution/dispersion of the binder, and then pulverized and dispersed, while controlling them to have a predetermined average particle diameter by using a ball milling process, or the like.

Although there is no particular limitation in the process for coating the composition for forming a porous coating layer onto the porous polymer substrate, it is preferred to use a slot coating or dip coating process. A slot coating process includes coating a composition supplied through a slot die onto the whole surface of a porous polymer substrate and is capable of controlling the thickness of a coating layer depending on the flux supplied from a metering pump. In addition, dip coating process includes dipping a porous polymer substrate into a tank containing a composition to carry out coating and is capable of controlling the thickness of a coating layer depending on the concentration of the composition and the rate of removing the substrate from the tank. Further, in order to control the thickness of the coating more precisely, it is possible to carry out post-metering through a Mayer bar or the like, after dipping.

Then, the porous polymer substrate coated with the composition for forming a porous coating layer may be dried in an oven, thereby forming a porous coating layer on at least one surface of the porous polymer substrate.

In the porous coating layer, the particles are bound to one another by the binder, while they are packed and are in contact with each other, thereby forming interstitial volumes among the particles, and the interstitial volumes among the particles become vacant spaces to form pores.

In other words, the binder attaches the particles to one another so that they may retain their binding states. For example, the binder connects the particles with one another and fixes them. In addition, the pores of the porous coating layer are those formed by the interstitial volumes among the particles which become vacant spaces. The spaces may be defined by the particles facing each other substantially in a closely packed or densely packed structure of the particles.

Although the thickness of the porous coating layer is not particularly limited, the porous coating layer may have a thickness of 0.5-3 μm, 1.0-2.5 μm, or 1.0-2.0 μm. When the thickness of the porous coating layer satisfies the above-defined range, the porous coating layer can be provided with suitable mechanical strength required for a separator, while not functioning as resistance.

In addition, the pores formed in the porous coating layer may have an average diameter of 10-100 nm, 15-80 nm, 20-70 nm, or 33-48 nm. When the average diameter of the pores formed in the porous coating layer satisfies the above-defined range, the porous coating layer does not function as resistance and lithium ions can be transported smoothly.

The ratio (a/b) of the average diameter (a) of the pores formed in the porous coating layer to the average diameter (b) of the pores formed in the porous polymer substrate may be 2.0 or less, 0.5-2.0, 0.75-1.25, or 0.938-1.363. When the ratio (a/b) of the average diameter (a) of the pores formed in the porous coating layer to the average diameter (b) of the pores formed in the porous polymer substrate satisfies the above-defined range, it is possible to prevent a micro-short between a cathode and an anode and to maintain functions as a separator, while maintaining smooth lithium ion transport.

In addition, the porous coating layer may have a porosity of 30-80%, 35-70%, 38-65%, or 51-65%. When the porosity of the porous coating layer satisfies the above-defined range, the porous coating layer does not function as resistance and lithium ions can be transported smoothly.

In another aspect of the present disclosure, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art.

Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Particular examples of the cathode active material include nickel-based lithium oxides, such as a cathode active material represented by $Li_a(Ni_{1-x-y-z}Co_xMn_yM_z)O_2$ (wherein M is an element selected from the group consisting of boron (B), magnesium (Mg), calcium (Ca), strontium (Sr), barium (Ba), titanium (Ti), vanadium (V), chromium (Cr), iron (Fe), copper (Cu), zirconium (Zr) and aluminum (Al), $0.95 \leq a \leq 1.3$, $x \leq (1-x-y-z)$, $y \leq (1-x-y-z)$, $z \leq (1-x-y-z)$, $0 < x < 1$, $0 \leq y < 1$, and $0 \leq z < 1$). Non-limiting examples of such cathode active materials include $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.7}Co_{0.1}Mn_{0.2}O_2$, $LiNi_{0.8}Co_{0.1}Mn_{0.1}O_2$, or $LiNi_{0.85}Co_{0.01}Al_{0.05}O_2$.

Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Manufacture of Composite Separator

A polyethylene porous film (W Scope, WL11B, porosity 43%, theoretical density of porous polymer substrate 0.973 g/cm³, actual density of porous polymer substrate 0.555 g/cm³, pore size 48 nm, shut-down temperature 140° C., melt-down temperature 147° C.) having a thickness of 11 μm was prepared as a porous polymer substrate.

To form a porous coating layer, crosslinked polyacrylic acid (PAA) (Aekyung, development) was prepared as a binder, and alumina ($Al_2O_3$) particles (Cabot, SpectrAl 81) having an average particle diameter of 20 nm and a specific surface area of 81 g/m² were prepared as inorganic particles. A binder solution was prepared by dissolving 10 parts by weight of the crosslinked polyacrylic acid (PAA) (Aekyung, development) in 100 parts by weight of water. The inorganic particles were added to and dispersed in the resultant binder solution to a weight ratio of binder/inorganic particles of 5/95, thereby providing a composition for forming a porous coating layer.

The composition for forming a porous coating layer was coated on one surface of the porous polymer substrate to a thickness of 1.5 μm, followed by drying, to obtain a composite separator. The resultant porous coating layer had a porosity of 51% (theoretical density of porous coating layer material 3.88 g/cm³, actual density of porous coating layer material 1.90 g/cm³), the melt-down temperature of the composite separator was improved to 179° C., and the shut-down temperature after removing the coating layer was 140° C.

The ratio (a/b) of the average diameter (a) of the pores formed in the porous coating layer to the average diameter (b) of the pores formed in the porous polymer substrate was 0.938.

In addition, after forming the porous coating layer (forming the composite), the melt-down temperature was increased so that the difference between the melt-down temperature of the porous polymer substrate used for the composite separator and the melt-down temperature of the composite separator was 32° C.

(2) Preparation of Porous Coating Layer for Determination of Pore Size

To form a porous coating layer, crosslinked polyacrylic acid (PAA) (Aekyung, development) was prepared as a binder, and alumina ($Al_2O_3$) particles (Cabot, SpectrAl 81) having an average particle diameter of 20 nm and a specific surface area of 81 g/m² were prepared as inorganic particles. A binder solution was prepared by dissolving 10 parts by weight of the crosslinked polyacrylic acid (PAA) (Aekyung, development) in 100 parts by weight of water. The inorganic particles were added to and dispersed in the resultant binder solution to a weight ratio of binder/inorganic particles of 5/95, thereby providing a composition for forming a porous coating layer.

A non-woven web (Mitsubishi Paper Mills, Ln1-1511, pore size 5.1 μm) was prepared. The non-woven web (Mitsubishi Paper Mills, Ln1-1511, pore size 5.1 μm) was used as a support and the composition for forming a porous coating layer was coated on one surface of the support to a coating thickness of 5 μm through a dip coating process.

The pore size determined by using the half-finished product was 45 nm.

(3) Manufacture of Electrochemical Device (Lithium Secondary Battery)

1) Manufacture of Cathode and Anode

First, 96 parts by weight of $LiNi_{0.7}Co_{0.1}Mn_{0.2}O_2$ as a cathode active material, 2 parts by weight of acetylene black as a conductive material and 2 parts by weight of polyvinylidene fluoride (PVDF) as a binder were added to and mixed with N-methyl-2-pyrrolidone (NMP) to prepare cathode active material slurry, and the slurry was coated on an aluminum (Al) current collector, followed by drying, to obtain a cathode.

Then, 96 parts by weight of graphite as an anode active material, 0.5 parts by weight of acetylene black as a conductive material, 1.0 parts by weight of carboxymethyl cellulose (CMC) as a thickener and 2.5 parts by weight of styrene butadiene rubber (SBR) as a binder were added to and mixed with water to prepare anode active material slurry, and the slurry was coated on a copper (Cu) current collector, followed by drying, to obtain an anode.

2) Manufacture of Lithium Secondary Battery

The cathode, anode and the composite separator obtained as described above were used to manufacture a pouch-type cell. Then, an electrolyte (EC/EMC=1/2 volume ratio, $LiPF_6$ 1M) was injected to the cell to obtain a lithium secondary battery.

Example 2

A composite separator and a lithium secondary battery using the same were obtained in the same manner as Example 1, except that the inorganic particles were changed into alumina ($Al_2O_3$) particles (Cabot, SpectrAl 51) having an average particle diameter of 20 nm and a specific surface area of 51 g/m².

Herein, the coating layer of the resultant composite separator had a porosity of 52% (theoretical density of porous coating layer material 3.88 g/cm³, actual density of porous coating layer material 1.86 g/cm³), the melt-down temperature of the composite separator was improved to 177° C., and the shut-down temperature after removing the coating layer was 140° C. The ratio of the pore size of the porous coating layer based on that of the porous polymer substrate was 0.979 (pore size of substrate 48 nm, pore size of coating layer 47 nm), and the melt-down temperature was increased by 30° C. after forming the porous coating layer (forming the composite).

Example 3

A composite separator and a lithium secondary battery using the same were obtained in the same manner as Example 1, except that the porous polymer substrate was changed into a polyethylene porous film (Toray, F15CK2, porosity 49%, theoretical density of porous polymer substrate 0.973 g/cm³, actual density of porous polymer substrate 0.496 g/cm³, pore size 37 nm, shut-down temperature 140° C., melt-down temperature 148° C.) having a thickness of 15 μm.

Herein, the coating layer of the resultant composite separator had a porosity of 51% (theoretical density of porous coating layer material 3.88 g/cm³, actual density of porous coating layer material 1.90 g/cm³), the melt-down temperature of the composite separator was improved to 179° C., and the shut-down temperature after removing the coating layer was 140° C. The ratio of the pore size of the porous coating layer based on that of the porous polymer substrate was 1.216 (pore size of substrate 37 nm, pore size of coating layer 45 nm), and the melt-down temperature was increased by 31° C. after forming the porous coating layer (forming the composite).

Example 4

A composite separator and a lithium secondary battery using the same were obtained in the same manner as Example 1, except that the porous polymer substrate was changed into a polyethylene porous film (Senior, SW710H, porosity 55%, theoretical density of porous polymer substrate 0.968 g/cm³, actual density of porous polymer substrate 0.436 g/cm³, pore size 33 nm, shut-down temperature 134° C., melt-down temperature 147° C.) having a thickness of 10 μm, and the binder for forming a porous coating layer was changed into an acrylic emulsion (Toyo Ink, CSB130).

Example 5

A composite separator and a lithium secondary battery using the same were obtained in the same manner as Example 4, except that a mixture of crosslinked polyacrylic acid (PAA) (Aekyung, development) with an acrylic emulsion (Toyo Ink, CSB130) at a weight ratio of 1:1 was used as a binder for forming a porous coating layer.

Comparative Example 1

A composite separator and a lithium secondary battery using the same were obtained in the same manner as Example 1, except that the inorganic particles were changed into alumina particles (Sumitomo, AES11) having an average particle diameter of 800 nm.

Herein, the porous coating layer of the resultant composite separator had a pore size of 154 nm and a porosity of 59% (theoretical density of porous coating layer material 3.88 g/cm³, actual density of porous coating layer material 1.59 g/cm³), and the melt-down temperature of the composite separator was 150° C.

The ratio of the pore size of the porous coating layer based on that of the porous polymer substrate was 3.208, and the melt-down temperature was increased merely by 3° C. after forming the composite.

Test Methods

Each of the composite separators according to Examples 1-5 and Comparative Example 1 was determined in terms of the porosity of the porous polymer substrate, porosity of the porous coating layer, pore size of the porous polymer substrate, pore size of the porous coating layer, shut-down temperature of the porous polymer substrate and the melt-down temperature of the porous polymer substrate as follows. The results are shown in the following Table 1.

Porosity of Porous Polymer Substrate

The porosity of a porous polymer substrate is determined by dividing the 'actual density (X) (weight per unit area/thickness)' of the porous polymer substrate by 'theoretical density (Y)' of the porous polymer substrate, and is expressed in terms of percentage (%) by subtracting the calculated value from 1 and multiplying the resultant value by 100, as shown in the following formula.

'Porosity' of porous polymer substrate (%)= [1−$X/Y$]×100

Porosity of Porous Coating Layer

The porosity of a porous coating layer is determined by dividing the 'actual density (W) (weight per unit area/thickness)' of the porous coating layer material by 'theoretical density (Z)' of the porous coating layer material, and is expressed in terms of percentage (%) by subtracting the calculated value from 1 and multiplying the resultant value by 100, as shown in the following formula.

'Porosity' of porous polymer substrate (%)= [1−$W/Y$]×100

Average Diameter (b) of Pores Formed in Porous Polymer Substrate

The average diameter (b) of the pores formed in a porous polymer substrate is determined by using a capillary flow porometer available from PMI Co.

Average Diameter (a) of Pores Formed in Porous Coating Layer

The average diameter (a) of the pores formed in a porous coating layer is determined by using a capillary flow porometer available from PMI Co., after coating a composition for forming a porous coating layer on a non-woven web support.

Shut-Down Temperature of Porous Polymer Substrate

The shut-down temperature is determined by dissolving and removing a porous coating layer formed in a composite separator, fixing only a porous polymer substrate to a frame (outer size: 15 cm×15 cm, inner diameter: 10 cm×10 cm) with a polyimide tape, and exposing the porous polymer substrate to a convection oven at a warming rate of 3° C./min starting from 80° C. to measure the air permeation time. Herein, the temperature where the air permeation time (Gurley value) exceeds 10,000 sec/100 mL for the first time is defined as shut-down temperature. The air permeation time (sec) is determined by measuring a time required for 100 mL of air to pass through the porous polymer substrate under a constant pressure (0.05 MPa) with an air permeability tester (available from Asahi Seiko, Model name: EG01-55-1MR).

Determination of Melt-Down Temperature

The melt-down temperature is determined by applying a load of 0.01 N to a composite separator prepared with a size of 4 mm×8 mm with a thermomechanical analyzer (TMA), measuring a degree of deformation, while the temperature is increased at a rate of 5° C./min, and measuring the temperature, where the composite separator is shrunk due to an increase in temperature, elongated again, and then broken. The temperature is defined as the melt-down temperature of the composite separator.

In addition, the porous coating layer formed in a composite separator is dissolved and removed in the same manner as described in the above part of 'shut-down temperature'. Then, the melt-down temperature of the porous polymer substrate was determined in the above-described method for determining melt-down temperature.

Evaluation of Safety of Battery

Each of the lithium secondary batteries according to Examples 1-5 and Comparative Example 1 was tested in terms of high-temperature storage characteristics. The results are shown in the following Table 1.

The high-temperature storage test was carried out by warming a fully charged lithium secondary battery from room temperature (25° C.) to 150° C. at a rate of 5° C./min. Then, when the temperature reached 150° C., the battery was allowed to stand at the same temperature for 1 hour. If ignition occurred in the battery, the battery was evaluated as 'Fail'. On the other hand, if no ignition occurred in the battery, the battery was evaluated as 'Pass'.

separators according to Examples 1-5 shows an increment in melt-down temperature of 30° C. or higher, while the composite separator according to Comparative Example 1 shows an increment in melt-down temperature of merely 3° C. As a result, the lithium secondary battery according to Comparative Example 1 causes ignition during the evaluation of battery safety. On the contrary, in the case of the lithium secondary batteries according to Examples 1-5, each of the separators can inhibit a short-circuit between the cathode and the anode, even when the battery is exposed under an overheating condition at 150° C. for 1 hour. Thus, it can be seen that the lithium secondary batteries according to Examples 1-5 have improved safety.

What is claimed is:

1. A composite separator for an electrochemical device, comprising:
    a porous polymer substrate having a plurality of pores; and
    a porous coating layer formed on at least one surface of the porous polymer substrate,
    wherein the porous coating layer comprises a plurality of particles and a binder positioned on at least a part of the surface of the particles to connect and fix the particles with one another,
    wherein the particles are inorganic particles having an average particle diameter of 10 nm to 380 nm,
    a ratio (a/b) of an average diameter (a) of pores formed in the porous coating layer to an average diameter (b) of pores formed in the porous polymer substrate is 2.0 or less, and
    wherein the composite separator has a melt-down temperature of 170° C. or higher.

TABLE 1

|  | Ex. 1 | Ex. 2 | Ex. 3 | Ex. 4 | Ex. 5 | Comp. Ex. 1 |
| --- | --- | --- | --- | --- | --- | --- |
| Porosity of porous polymer substrate (%) | 43 | 43 | 49 | 55 | 55 | 43 |
| Porosity of porous coating layer (%) | 51 | 52 | 51 | 51 | 51 | 59 |
| Average diameter (a) of pores formed in porous coating layer (nm) | 48 | 48 | 37 | 33 | 33 | 48 |
| Average diameter (b) of pores formed in porous polymer substrate (nm) | 45 | 47 | 45 | 45 | 45 | 154 |
| Ratio (a/b) of average diameter (a) of pores formed in porous coating layer to average diameter (b) of pores formed in porous polymer substrate | 0.938 | 0.979 | 1.216 | 1.363 | 1.363 | 3.208 |
| Melt-down temperature of porous polymer substrate (° C.) | 147 | 147 | 148 | 142 | 142 | 147 |
| Melt-down temperature of composite separator (° C.) | 179 | 177 | 179 | 174 | 177 | 150 |
| Increment in melt-down temperature (° C.) | 32 | 30 | 31 | 32 | 35 | 3 |
| Evaluation of battery safety | Pass | Pass | Pass | Pass | Pass | Ignition |

Herein, 'increment in melt-down temperature' means a difference between the melt-down temperature of a porous polymer substrate used for a composite separator for an electrochemical device and the melt-down temperature of the composite separator for an electrochemical device. It can be seen from the above results that each of the composite 2. The composite separator for the electrochemical device according to claim 1, wherein a difference between a melt-down temperature of the porous polymer substrate of the composite separator and the melt-down temperature of the composite separator is 30° C. or higher.

3. The composite separator for the electrochemical device according to claim 1, wherein the porous polymer substrate has a shut-down temperature of 140° C. or lower.

4. The composite separator for the electrochemical device according to claim 1, wherein the composite separator has a melt-down temperature in a range of 170-220° C.

5. The composite separator for the electrochemical device according to claim 2, wherein the difference between the melt-down temperature of the porous polymer substrate of the composite separator and the melt-down temperature of the composite separator is in a range of 30-90° C.

6. The composite separator for the electrochemical device according to claim 1, wherein the particles are bound to one another by the binder, wherein the particles packed and in contact with each other, thereby forming interstitial volumes among the particles, and the interstitial volumes among the particles become vacant spaces to form the pores.

7. The composite separator for the electrochemical device according to claim 1, wherein the ratio (a/b) of the average diameter (a) of the pores formed in the porous coating layer to the average diameter (b) of the pores formed in the porous polymer substrate is 0.75-1.25.

8. The composite separator for the electrochemical device according to claim 1, wherein the average particle diameter of the inorganic particles is 10 nm-150 nm.

9. The composite separator for the electrochemical device according to claim 1, wherein the binder is at least one of polyvinyl alcohol, polyacrylic acid, polyvinyl pyrrolidone, or an acrylic copolymer.

10. An electrochemical device comprising:
a cathode,
an anode, and
a separator interposed between the cathode and the anode,
wherein the separator is the composite separator according to claim 1.

11. The electrochemical device according to claim 10, wherein the electrochemical device is a lithium secondary battery.

* * * * *